(12) United States Patent
Taylor (10) Patent No.: US 7,580,976 B2
(45) Date of Patent: Aug. 25, 2009

(54) IDENTIFYING AN APPROPRIATE CONNECTION POINT FOR CONNECTING TO AN APPLICATION LAYER SESSION

(75) Inventor: John Anthony Taylor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/418,493

(22) Filed: Apr. 18, 2003

(65) Prior Publication Data

US 2004/0210659 A1 Oct. 21, 2004

(51) Int. Cl.
G06F 15/16 (2006.01)

(52) U.S. Cl. ........................................ 709/204; 709/205
(58) Field of Classification Search ......... 709/204–207, 709/241, 243, 244
See application file for complete search history.

(56) References Cited

U.S. PATENT DOCUMENTS

| | | | | | |
|---|---|---|---|---|---|
| 6,012,096 | A | * | 1/2000 | Link et al. | 709/233 |
| 6,122,259 | A | * | 9/2000 | Ishida | 370/260 |
| 6,567,813 | B1 | * | 5/2003 | Zhu et al. | 707/100 |
| 7,334,017 | B2 | * | 2/2008 | Hawkes et al. | 709/205 |
| 2002/0002613 | A1 | * | 1/2002 | Freeman et al. | 709/225 |
| 2002/0055974 | A1 | * | 5/2002 | Hawkes et al. | 709/204 |
| 2003/0031123 | A1 | * | 2/2003 | Gilmour et al. | 370/216 |
| 2003/0041165 | A1 | * | 2/2003 | Spencer et al. | 709/233 |
| 2004/0165710 | A1 | * | 8/2004 | DelHoyo et al. | 379/202.01 |

OTHER PUBLICATIONS

"Contructing Shared-Tree for Group Multicast with QoS Constraints" Aiguo Fei, Zhihong Duan, and Mario Gerla, Computer Science Department, University of California, Los Angeles, CA 90095, 2001 IEEE, p. 2389 to 2394.

* cited by examiner

Primary Examiner—Salad Abdullahi
Assistant Examiner—Gregory G Todd
(74) Attorney, Agent, or Firm—Perkins Coie LLP (57) ABSTRACT

A multi-party application layer session, such as, for example, an electronic conference, is configured to make efficient use of resources associated with lower layer connections that connect computer systems participating in the multi-party application layer session. In response to receiving an invitation to join a multi-party application layer session, a joining computer system calculates a closeness metric value at least to one or more zones of the multi-party application layer session. A closeness metric value is calculated from measured and/or pre-configured characteristics of lower layer connections. The joining computer system identifies an application layer connection point within a specified threshold of closeness to the joining computer system. The joining computer system establishes an application layer connection to the identified application layer connection point. Accordingly, a joining computer system considers the characteristics of lower layer connections when determining where to connect to a multi-party application layer session.

35 Claims, 5 Drawing Sheets

IDENTIFYING AN APPROPRIATE CONNECTION POINT FOR CONNECTING TO AN APPLICATION LAYER SESSION

BACKGROUND OF THE INVENTION

1. The Field of the Invention

The present invention relates to computer networks, and more specifically, to identifying an appropriate connection point for connecting to an application layer session.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes, such as, for example, electronic conferencing software.

The functionality of lower layers of a protocol stack is typically abstracted from the application layer. That is, application data is transferred to and from an application layer through the lower layers without exposing the functionality of the lower layers to the application layer. Abstraction can make it appear to a number of application layer processes at different computing systems that the application layer processes are directly connected to one another (when in fact lower layers in corresponding protocol stacks process data as the data transferred between the application layer processes). Accordingly, application layer processes may be viewed as logically connected regardless of the underlying physical connections that facilitate communication between the application layers processes.

Often, when computing systems are to communicate with each other, the computing systems will first establish a communication session. Establishment of a communication session can include establishing an application layer communication session, such as, for example, an electronic conference. To establish an electronic conference, conferencing applications (e.g., T.120 applications) at each of the computing systems logically connect to one another. The logical connections typically result in the computing systems being configured in a logical hierarchy, such as, for example, of a T.120 a conferencing session.

Figure 4A:
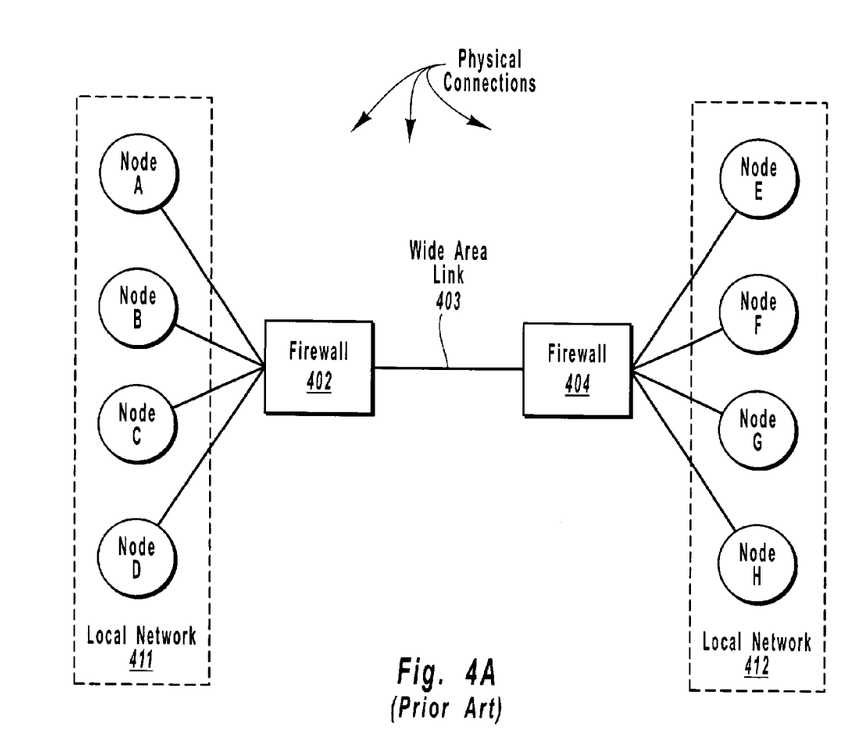
FIG. 4A illustrates a prior art network.
Figure 4B:
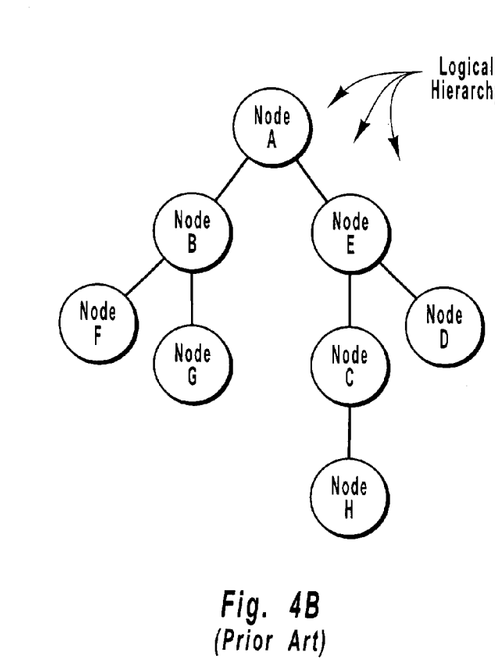
FIG. 4B illustrates a logical hierarchical tree of the computer systems depicted in the prior art network of FIG. 4A.

As depicted in FIG. 4B, a logically hierarchy can include a root computing system (or root node), one or more intermediate computing systems (or intermediate nodes), and one or more leaf computing systems (or leaf nodes). A root computing system is a computing system at the top of the logical hierarchy (e.g., node A). A leaf computing system is a computing system with no other computing systems below them in the logical hierarchy (e.g., nodes F, G, H, and D). An intermediate computer system is a computer system somewhere between the root computing system and a leaf computing system in the logical hierarchy (e.g., nodes B, E, and C).

A root computing system typically controls the transfer of conferencing data between the other computing systems in the logical hierarchy. Each computing system in a logically hierarchy can maintain link information for sending conferencing data to and receiving conferencing data from other computing systems that are logically connected to the computing system. That is, each computing system can maintain link information for parent and/or child computer systems. For example in FIG. 4B, node E can maintain link information for communicating with node A (parent) and nodes C and D (children).

Typically, conferencing data originates at an intermediate or leaf computing system in one branch of the logical hierarchy. The intermediate or leaf computing system transfers the conferencing data up to its parent computer system. When the parent computer system is not the root computer system, the parent computer system in turn transfers the conferencing data up to its parent computer system. The conferencing data is transferred form parent computer system to parent computer system until the conferencing data eventually reaches the root computer system. For example in FIG. 4B, conferencing data originating at node H can be transferred from node H, to node C, to node E, to node A (the root).

The root computing system can transfer received conferencing data down a logical hierarchy to intermediate and leaf computing systems in the logical hierarchy. For example in FIG. 4B, node A can transfer conferencing data down to nodes B and E. Node B can in turn transfer the conferencing data down to nodes F and G. Likewise, node E can in turn transfer the conferencing data down to nodes C and D. Node C can in turn transfer the conferencing data down to node H. Accordingly, during a typical conferencing session, conferencing data flows up to the root computing system and then down from the root computer system to other computer systems in the logical hierarchy. This results in all of the computer systems sharing the same tree, even if conferencing data originates at an intermediate or leaf computer system.

At times, a computing system participating in an electronic conferencing may invite another computing system to join the electronic conference. To invite a computing system to join an existing electronic conference, an inviting conferencing application (at an inviting computing system) sends an invitation message to joining conferencing application (at a joining computing system). To join the electronic conference, the joining conferencing application uses connection information contained in the invitation message to logically connect to the inviting conferencing application. For example in FIG. 4B, node H could join node C resulting in the logical connection between node C and node H.

The resources consumed when transferring conferencing data over some physical connections (e.g., wide area connections, firewalls, proxies, and bastion hosts) can be relatively expensive compared to resources consumed when transferring data over other physical connections (e.g., local area connections). The increased expense can be both financial and from a resource availability perspective. For example, it may cost more financially to transfer conferencing data through firewall 402, across wide area data link 403, and/or through firewall 404 than it costs financially to transfer conferencing data within local network 411 or local network 412. Further, the system and bandwidth resources consumed by transferring conferencing data (which can be bandwidth intensive) through firewall 402, across wide area data link 403, and/or through firewall 404 makes these consumed resources potentially unavailable to other modules for the duration of the electronic conference.

Unfortunately, establishment of a logical hierarchy can result in a number of logical connections spanning across more costly physical connections. For example, a number of the logical connections between the nodes in FIG. 4B (e.g., node B to node F, node B to node G, node A to node E, etc.) span across firewall 402, wide area link 403, and firewall 404. When multiple logical connections span the same physical connection, the same conferencing data may be repeatedly transferred across the physical connection. For example, conferencing data transferred from node A to node H would be transferred across firewall 402, wide area link 403, and firewall 404 at least three times. The conferencing data would be transferred from node A to node E (a first transfer), from node E to node C (a second transfer), and from node C to node H (a third transfer). Repeatedly transferring conferencing data across a more costly physical connection essentially wastes the resources of physical connection. Therefore systems, methods, computer program products, and data structures for joining an application layer session in a manner that promotes efficient use of lower layer resources would be advantageous.

BRIEF SUMMARY OF THE INVENTION

The foregoing problems with the prior state of the art are overcome by the principles of the present invention, which are directed towards methods, systems, computer program products, and data structures for identifying an appropriate connection point for connecting to an application layer session. A multi-party application layer session, such as, for example, a multi-party conferencing session, includes a number of participating computer systems. Lower layer connections between participating computer systems can utilize any number of different network technologies (e.g., Ethernet, Token Ring, IEEE 802.11, etc.), network modules (e.g., firewalls, bastion hosts, etc.), and/or lower layer protocols (e.g., Internet Protocol ("IP"), Transmission Control Protocol ("TCP"), etc.). Further, different participating computer systems can utilize different network technologies, modules, and/or protocols to participate in the multi-party application layer session.

Conferencing applications at each of the participating computer systems are logically connected to one another (i.e., application layer connections are abstracted from lower layer connections) resulting in a logical arrangement of participating computer systems. It may be that a conferencing application at one participating computing system is logically connected to conferencing applications at a number of other participating computing systems. When a participating computer system detects that a non-participating computer system has conferencing data (or for any other reason), the participating computer system can invite the non-participating computer system to join the multi-party application layer session.

Accordingly, an inviting computer system can send an invitation to join the multi-party application layer session to a joining computer system and the joining computer system can receive the invitation. In response to the invitation, the joining computer system calculates a closeness metric value at least for each zone of the multi-party application layer session (and potentially for each participating computer system). A closeness metric value can indicate the representative closeness of the joining computer system to a zone. A closeness metric value can be calculated based on the characteristics of lower layer connections between the joining computer system and a corresponding zone. For example, a zone on the same local area network as the joining computer system can be viewed as closer to the joining computer system than a zone that is across a wide area link and behind a firewall.

The joining computer system identifies a application layer connection point within a specified threshold of closeness to the joining computer system. For example, a lower closeness metric value can indicate the joining computer system is closer to a corresponding zone. On the other hand, a higher closeness metric value can indicate that the joining computer system is further from a corresponding zone. The joining computer system may identify a computer system within the closest zone as an application layer connection point within a specified threshold of closeness.

The joining computer system establishes an application layer connection to the identified application layer connection point. For example, a joining application layer at the joining computer system can establish a connection to a participating application layer at a participating computer system. When calculated closeness metric values so indicate, the joining computer system can also establish a new zone. Accordingly, a joining computer system connects to an existing multi-party application layer session in a manner that reduces the likelihood of conferencing data being repeatedly transferred across more expensive lower layer connections.

In some embodiments, application layer data is transferred between computer systems in a manner that conserves resources associated with lower layer connections. A source computer system received an indication that application layer data is to be transferred to each participating computer system participating in a multi-party application layer session. The source computer system checks closeness metric values for at least each zone of the multi-party application layer session. The source computer system configures a data packet containing application layer data for delivery to a participating computer system based on the lower layer resource cost represented in a checked closeness metric value. The source computer system transfers the configured data packet towards the participating computer system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for identifying an application layer connection point for connecting to an application layer session based on characteristics of lower layer connections. A joining computer system receives an invitation to join a multi-party application layer session. The joining computer system calculates closeness metric values, based on characteristics of lower layer connections, at least for each zone of the multi-party application layer session (and potentially for every computer system participating in the multi-party application layer session). The joining computer system identifies an application layer connection point (e.g., an application layer at a computer system participating in the multi-layer application session) having a closeness metric value within a specified threshold. The joining computer system establishes an application layer connection to the identified application layer connection point. When calculated closeness metric values so indicate, the joining computer system can also establish a new zone. Based on zone configuration, application layer data can be transferred to computer systems participating in a multi-party application layer session in a manner that conserves lower layer resources.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or other media which can be used to store desired program code means in the form of computer-executable instructions, computer-readable instructions, or data structures and which may be accessed by a general-purpose or special-purpose computer system.

Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

In this description and the following claims, a "communications stack" is defined as a plurality of communication layers, including at least an application layer and one lower layer that is below the application layer, that interoperate to transfer data between computer systems. Communication stack is defined to include protocol stacks based around the Open Systems Interconnection ("OSI") networking framework for implementing protocols, including protocol stacks that incorporate the functionality of a plurality of OSI layers in a single layer.

In this description and in the following claims, "application layer connection" is defined as a connection between corresponding application layers of two or more communication stacks. An application layer connection is defined to include connections between applications and end-user processes, such as, for example, connections between real-time conferencing applications. Application layer connection is defined to include any connection that corresponds to functionality at a session layer, a presentation layer, and/or an application layer of the Open System Interconnection ("OSI") networking framework.

In this description and in the following claims, a "lower layer connection" is defined as a connection between corresponding lower layers (below an application layer) of two of more communication stacks. A lower layer connection is defined to include physical components, such as, for example, transmitters, receivers, wire, fiber optic cable, hubs, routers, firewalls, proxies, bastion hosts, modems, wireless access points, network interface cards, and system buses, that create a path (e.g., a circuit) for electrical pulses, light, or electromagnetic waves to travel between two computer systems. A lower layer connection is also defined include lower layer protocols, such as for, example, Ethernet, IEEE 802.11, RS 232, Digital Subscriber Line ("DSL"), Asynchronous Transfer Mode ("ATM"), Integrated Services Digital Network ("ISDN"), and Data Over Cable Service Interface Specification ("DOCSIS"), that convert electrical pulses, light, or electromagnetic waves into electronic data (e.g., a bit stream). Lower layer protocols also include protocols, such as, for example, Internet Protocol ("IP") and Transmission Control Protocol ("TCP"), that operate above the physical layer but below the application layer. Lower layer connection is defined to include any connection that corresponds to functionality at a physical layer, a data link layer (mediate access control layer and/or logical link control layer), a network layer, or a transport layer of the OSI networking framework.

Those skilled in the art will appreciate that the invention may be practiced in network computing environments with many types of computer system configurations, including routers, gateways, bastion hosts, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired lower layer connections, wireless lower layer connections, or by a combination of hardwired and wireless lower layer connections) through a network, both perform tasks. In a distributed system environment, program modules may be located in both local and remote memory storage devices.

Figure 1:
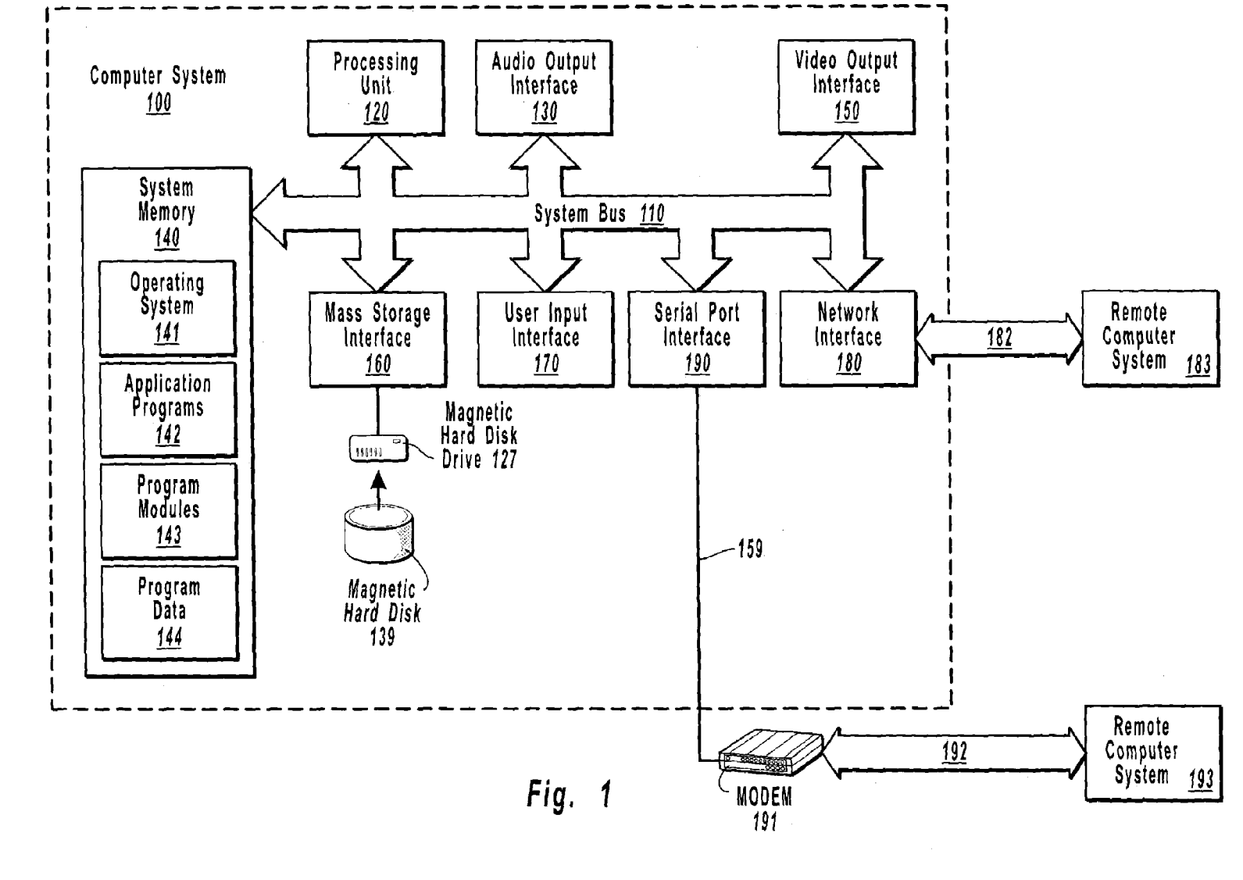
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 is connectable to networks, such as, for example, an office-wide or enterprise-wide computer network, an intranet, and/or the Internet. Computer system 100 can exchange data with external sources, such as, for example, remote computer systems and/or remote databases over such a network.

Computer system 100 includes network interface 180, through which computer system 100 receives data from external sources and/or transmits data to external sources. As illustrated in FIG. 1, network interface 180 facilitates the exchange of data with remote computer system 183 via connection 182 (which represents either a lower layer connection or an application layer connection). Connection 182 represents a portion of a network, and remote computer system 183 represents a node of the network. For example, remote computer system 183 may be a joining computer system that joins a multi-party application layer session by establishing an application layer connection to computer system 100. On the other hand, remote computer system 183 may be an inviting computer system that invites computer system 100 to join a multi-party application layer session.

Likewise, computer system 100 includes serial port interface 190, through which computer system 100 receives data from external sources and/or transmits data to external sources. Serial port interface 190 is coupled to modem 191 via connection 159 (which represents either a lower layer connection or an application layer connection), through which computer system 100 receives data from and/or transmits data to external sources. As illustrated in FIG. 1, serial port interface 190 and modem 191 facilitate the exchange of data with remote computer system 193 via connection 192 (which represents either a lower layer connection or an application layer connection). Connection 192 represents a portion of a network, and remote computer system 193 represents a node of the network. For example, remote computer system 193 may be a joining computer system that attempts to join a multi-party application layer session by establishing an application layer connection to computer system 100. On the other hand, remote computer system 193 may be an inviting computer system that invites computer system 100 to join a multi-party application layer session.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

When a mass storage device, such as, for example, magnetic hard disk 139, is coupled to computer system 100, such modules and associated program data may also be stored in the mass storage device. In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2A:
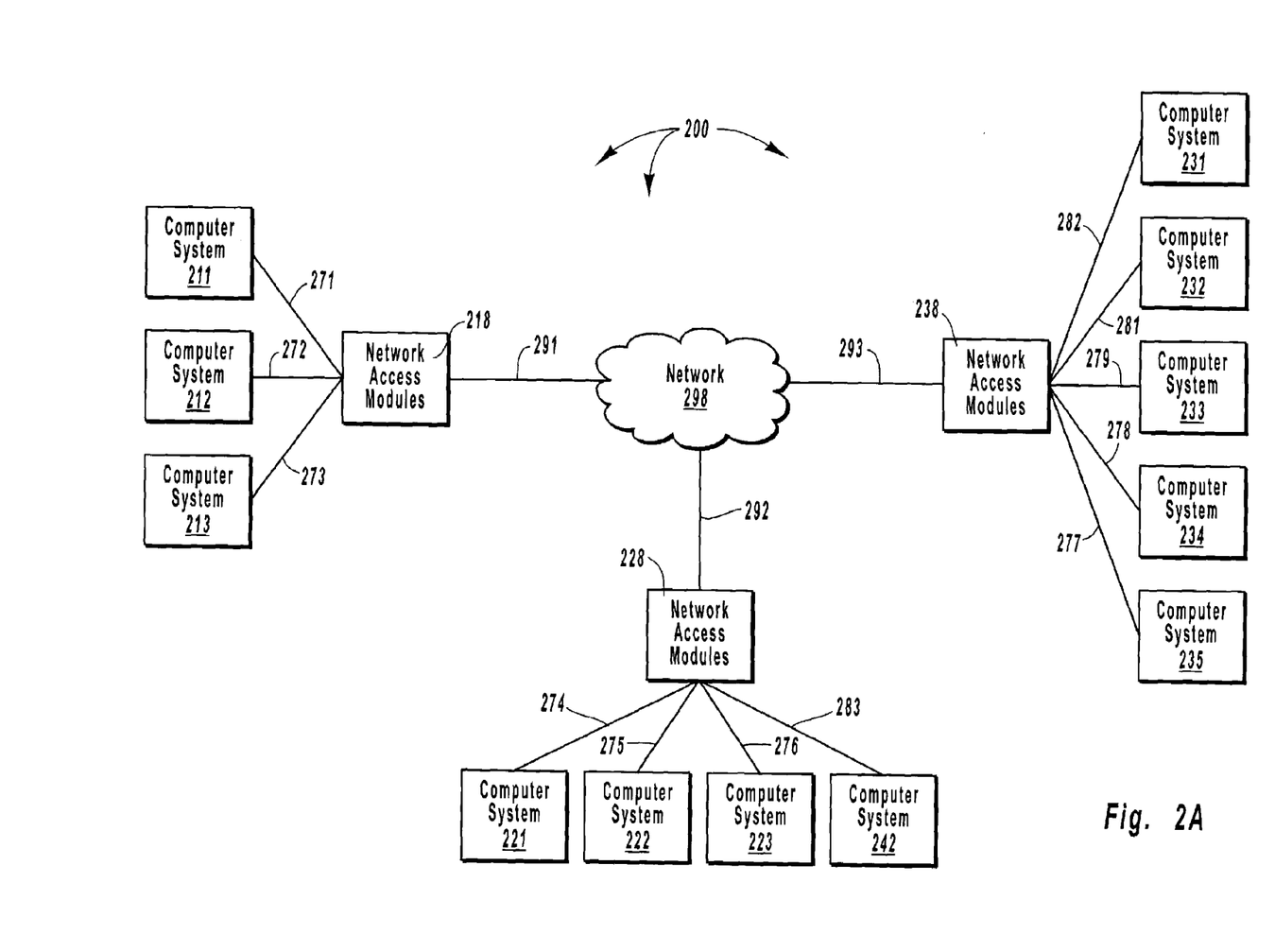
FIG. 2A illustrates an example network architecture that facilitates identifying an appropriate connection point for connecting to an application layer session in accordance with the principles of the present invention.

FIG. 2A illustrates an example network architecture 200 that facilitates identifying an appropriate connection point for connecting to an application layer session. As depicted in network architecture 200, computer systems 211, 212, and 213 are connected to network access modules 218 by corresponding lower layer connections 271, 272, and 273 respectively. Similarly, computer systems 221, 222, 223, and 242 are connected to network access modules 228 by corresponding lower layer connections 274, 275, 276, and 283 respectively. Similarly, computer systems 231, 232, 233, 234, and 235, are connected to network access modules 238 by corresponding lower layer connections 282, 281, 279, 278, and 277 respectively. Network modules 218, 228, and, 238 are connected to network 298 (e.g., a Wide Area Network ("WAN")) by corresponding lower layer connections 291, 292 and 293 respectively. Lower layer connections 291, 292, and 293 can be wide area connections. Each computer system in network architecture 200 can include an application layer (e.g., a conferencing application) for participating in multi-party application layer sessions (e.g., an electronic conference)

Network access modules can include one or more hardware and/or software security modules (e.g., of a gateway, bastion host, firewall, etc.) that prevent unauthorized access to computer systems connected to the network access modules. For example, network access modules 218 can include modules of a firewall that is configured to prevent unauthorized access to computer systems 211, 212, and 213. Network access modules can also include one or more hardware and/or software connectivity modules (e.g., of a router, switch, hub, etc.) that connect computer systems such that data can be transferred between the connected computer systems. For example, network access modules 238 can include modules of a hub that connects computer systems 231, 232, 233, 234, and 235 in a common Ethernet segment. Additionally, network access modules 238 can include modules of a router that connects the common Ethernet segment to lower layer connection 293. It may also be that network access modules collectively represent a plurality of security and/or connectivity modules (e.g., one or more firewalls, one or more bastion hosts, and one or more routers). A collection of such modules can be included in a Demilitarized Zone ("DMZ") for preventing unauthorized to computer systems. For example, network modules 228 can represent a DMZ that is configured to prevent unauthorized access to computer systems 221, 222, 223, and 242.

Figure 2B:
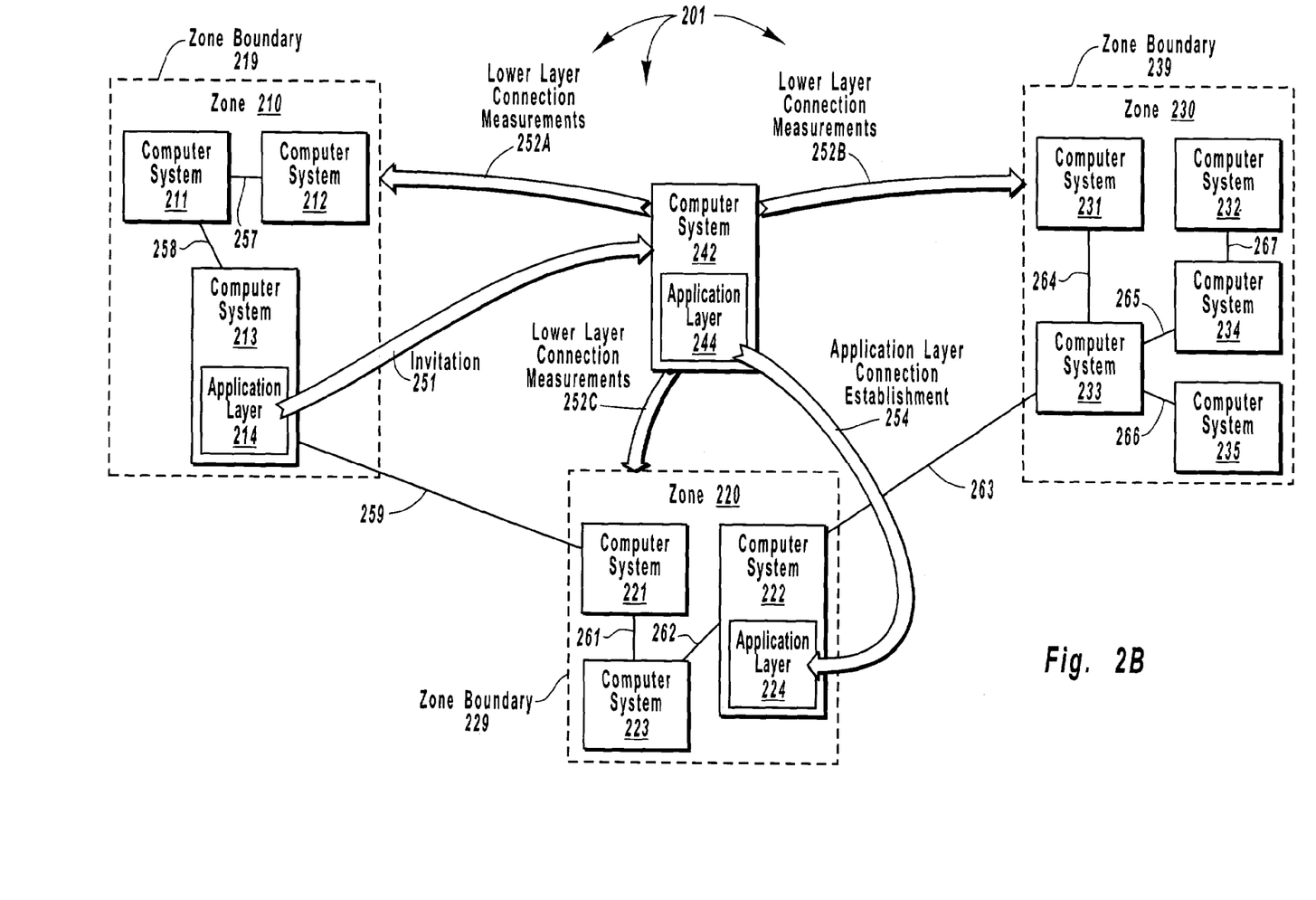
FIG. 2B illustrates an example logical arrangement of the computer systems depicted in FIG. 2A.

FIG. 2B illustrates an example logical arrangement 201 of computer systems depicted network architecture 200. Logical arrangement 201 can represent the logical arrangement of computer systems participating in an electronic conference. At times, computer systems depicted in network architecture 200 may have left or joined the electronic conference. Accordingly, logical arrangement 201 may be the result of joining computer systems establishing application layer connections to the electronic conference and leaving computer systems tearing down application layer connections to the electronic conference.

Depicted in logical arrangement 201 are zones 210, 220, and 230. Each zone includes computer systems that are within a representative closeness of one another. Within logical arrangement 201, application layers can communicate with one another through application layer connections (e.g., between conferencing applications at each computer system) that are abstracted from lower layer connections depicted in network architecture 200. For example, zone 210 includes computer systems 211, 212, and 213 that are connected by application layer connections 257 and 258. Zone 220 includes computer systems 221, 222, and 223 that are connected by application layer connections 261 and 262. Zone 230 includes computer systems 231, 232, 233, 234, and 235 that are connected by application layer connections 264, 265, 266, and 267. Each application layer connection in logical arrangement 201 can represent a connection between application layers at different computer systems. For example, application layer connection 265 can represent a connection between a conferencing application at computer system 233 and a corresponding conferencing application at computer system 234.

Further, application layer connection 259 connects computer system 213 and computer system 221, thereby also connecting zone 210 to zone 220. Similarly, application layer connection 263 connects computer system 222 and computer system 233 and thereby also connecting zone 220 to zone 230. Accordingly, when conferencing data is to be transferred to computer systems in logical arrangement 201, the conferencing data can be transferred between zones a reduced number of times, for example, once.

Determining a computer system's closeness to other computer systems can include calculating a closeness metric value based on characteristics of lower layer connections between the computer systems. For example, a closeness metric value representing computer system 212's closeness to computer system 213 can be calculated based on the characteristics of lower layer connection 273, network modules 218, and lower layer connection 272. Characteristics of a lower layer connection can include available bandwidth, maximum bandwidth, latency, supported protocols, resource consumption of network modules, etc. For example, when calculating a closeness metric value representing computer system 211's closeness to computer system 234, the cost (e.g., either financially or in consumed resources) of transferring conferencing data through network modules 218 and network modules 238 can be considered.

A closeness metric value can be a single value calculated from a plurality of appropriate lower layer connection characteristics. The weight of different network characteristics can be varied by a conference administrator or user so that appropriate closeness metric values are calculated for a given configuration of lower layer connections. The weights of reduced bandwidth and/or increased latency lower layer connections can be selected so that computer systems separated by reduced bandwidth and/or increased latency lower layer connections are viewed as having reduced closeness. On the other hand, weights of increased bandwidth and/or reduced latency lower layer connections can be selected to that computer systems separated by increased bandwidth and/or reduced latency lower layer connections are viewed as having increased closeness. For example, computer systems separated by a 100 Mbps (megabits per second) Ethernet segment can be viewed as closer than computer systems separated by a 56 Kbps (kilobits per second) modem connection.

Similarly, when resources of network modules are more expensive, closeness metric values for computer systems on opposite sides of the network modules can indicate that the computer systems have reduced closeness. On the other hand, when resources of network modules are less expensive, closeness metric values for computer systems on opposite sides of the network modules can indicate the computer systems have increased closeness. For example, computer systems separated by a single firewall can be viewed as closer than computer systems separated a DMZ having a plurality of firewalls and bastion hosts.

Table 1 is an example of closeness metric values for computer systems depicted in network architecture 200.

TABLE 1

|        | CS 211 | CS 212 | CS 213 | CS 221 | CS 222 | CS 223 | CS 231 | CS 232 | CS 233 | Cs 234 | CS 235 |
|--------|--------|--------|--------|--------|--------|--------|--------|--------|--------|--------|--------|
| CS 211 | 0      | 1      | 1      | 7      | 7      | 7      | 9      | 9      | 9      | 9      | 9      |
| CS 212 | 1      | 0      | 1      | 7      | 7      | 7      | 9      | 9      | 9      | 9      | 9      |
| CS 213 | 1      | 1      | 0      | 7      | 7      | 7      | 9      | 9      | 9      | 9      | 9      |
| CS 221 | 7      | 7      | 7      | 0      | 1      | 1      | 8      | 8      | 8      | 8      | 8      |
| CS 222 | 7      | 7      | 7      | 1      | 0      | 1      | 8      | 8      | 8      | 8      | 8      |
| CS 223 | 7      | 7      | 7      | 1      | 1      | 0      | 8      | 8      | 8      | 8      | 8      |
| CS 231 | 9      | 9      | 9      | 8      | 8      | 8      | 0      | 1      | 1      | 1      | 1      |
| CS 232 | 9      | 9      | 9      | 8      | 8      | 8      | 1      | 0      | 1      | 1      | 1      |
| CS 233 | 9      | 9      | 9      | 8      | 8      | 8      | 1      | 1      | 0      | 1      | 1      |
| CS 234 | 9      | 9      | 9      | 8      | 8      | 8      | 1      | 1      | 1      | 0      | 1      |
| CS 235 | 9      | 9      | 9      | 8      | 8      | 8      | 1      | 1      | 1      | 1      | 0      |

In Table 1, the abbreviation "CS" represents the term "computer system." Accordingly, each row and column in table one corresponds to a computer system in network architecture 200. For example, "CS 223" corresponds to computer system 223. Table 1 includes closeness metric values representing the closeness of computer systems in network architecture 200 to other computer systems in network architecture 200. For example, the row labeled CS 213 indicates computer system 213's closeness to other computer systems included in network architecture 200.

In Table 1, lower closeness metric values indicate computer systems with increased closeness (i.e., that are closer together), while higher closeness metric values indicate computer systems with decreased closeness (i.e., that are further apart). For example, computer systems having a closeness metric value of 1 are viewed as being closer to one another than computer systems having a closeness metric value of 7. A closeness metric value of 0 indicates that a computer system is closer to itself than any other computer system. Although the closeness metric values in Table 1 range from 0 to 9 with lower values representing increased closeness and higher values representing decreased closeness, virtually any range or configuration of values can be used to represent relative closeness between computer systems.

As depicted in Table 1, computer system 213 has a closeness metric value of 1 for computer systems 211 and 212, a closeness metric value of 7 for computer systems 221, 222, 223, and a closeness metric value of 9 for computer systems 231, 232, 233, 234, 235. These depicted closeness metric values indicate that computer system 213 is relatively closer to computer systems in zone 210 (closeness metric value of 1) than computer systems in zone 220 (closeness metric value of 7) and computer systems in zone 230 (closeness metric value of 9). These depicted closeness metric values further indicate that computer system 213 is relatively closer to computer systems in zone 220 (closeness metric value of 7) than computer systems in zone 230 (closeness metric value of 9). These depicted closeness metric values for computer system 213 may indicate, for example, that computer systems in zone 210 are part of the same Ethernet segment. These depicted closeness metric values for computer system 213 may further indicate, for example, that the Ethernet segment is separated from computer systems in zones 220 and 230 by reduced bandwidth lower layer connections and/or network access modules having more expensive resource costs.

Figure 3:
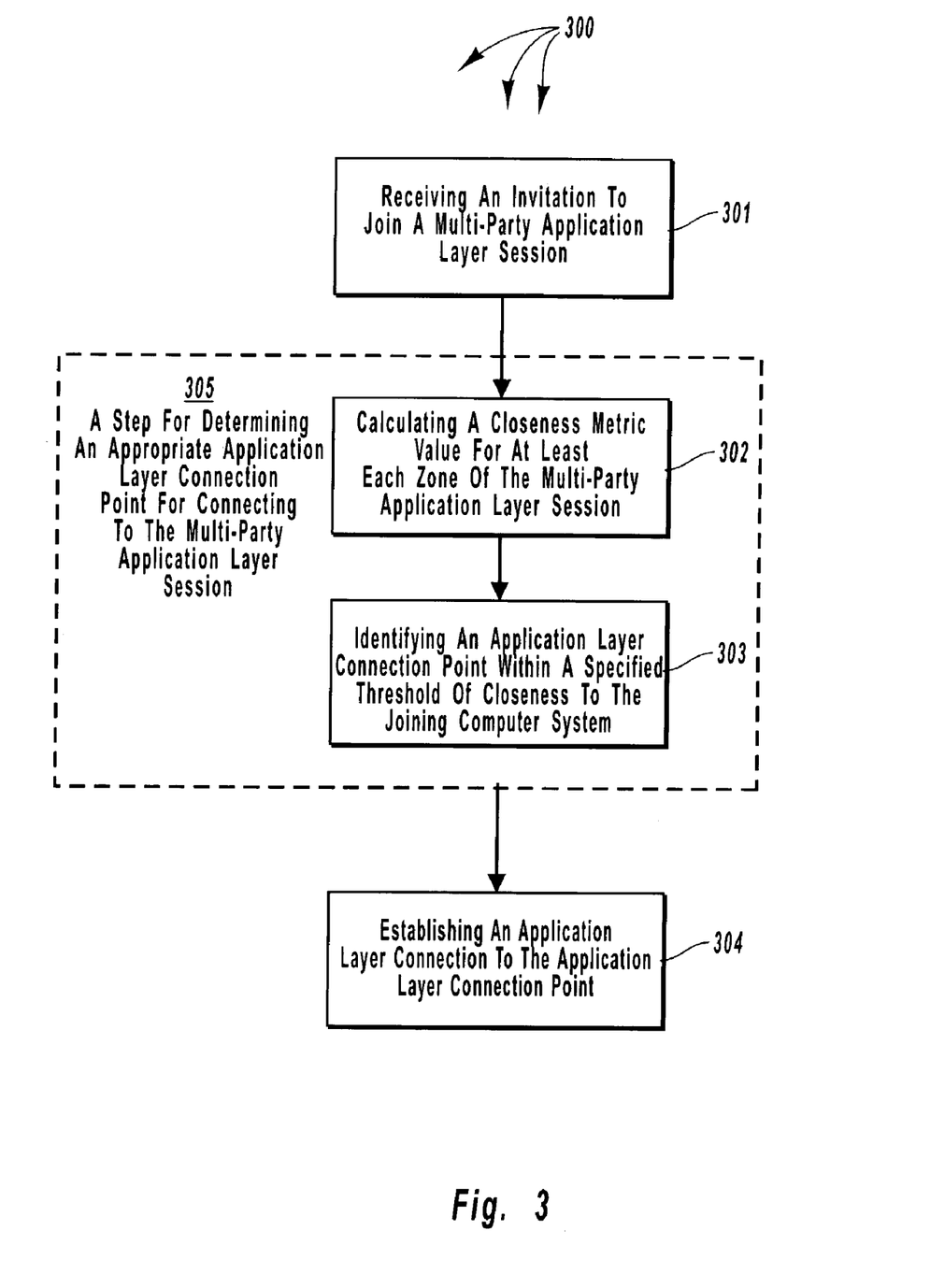
FIG. 3 illustrates an example flowchart of a method for identifying an appropriate connection point for connecting to an application layer session in accordance with the principles of the present invention.

When a joining computer system is to join a multi-party application layer session, such as, for example, an electronic conference, the joining computer system can determine the zone that is closest to the joining computer system. FIG. 3 illustrates a flowchart of a method 300 for identifying a connection point for connecting to an application layer session.

The method 300 will be described with respect to the computer systems depicted in network architecture 200.

Method 300 includes an act of receiving an invitation to join a multi-party application layer session (act 301). Act 301 can include a joining computer system receiving an invitation message from an inviting computer system. The inviting computer system can be a computer system that is establishing a new electronic conference or that is already participating in an existing electronic conference. For example as depicted by invitation 251, application layer 214 can invite computer system 242 to join an electronic conference represented by logical arrangement 201.

The method 300 includes a functional result-oriented step for determining an appropriate connection point for connecting to the multi-party application layer session (step 305). Step 305 can include any corresponding acts for accomplishing the result of determining an appropriate connection! point for connecting to the multi-party application layer session. However, in the illustrated example of FIG. 3, step 305 includes a corresponding act of calculating a closeness metric value for at least each zone of the multi-party application layer session (act 302). Act 302 can include calculating closeness metric values from characteristics of lower layer connections that connect the joining computer system to a corresponding zone.

For example, computer system 242 can calculate a closeness metric value for computer systems in zones 210, 220, and 230. A closeness metric value can be calculated at least in part based on pre-configured characteristics, such as, for example, cost. For example, a hop across firewall and proxy modules represented by network modules 228 can have a pre-configured associated cost (financial and/or consumed resources). The pre-configured associated cost can be used to calculate a closeness metric value.

A closeness metric value can also be calculated at least in part based on network measurements. As depicted by lower layer connection measurements 252A, 252B, and 252C, computer system 242 measures characteristics of lower layer connections between computer system 242 and zones 210, 230, and 220 respectively. For example, computer system 242 can ping computer system 232 to measure round trip times for data packets traveling over a data path including lower layer connection 283, network access modules 228, lower layer connection 292, network 298, lower layer connection 293, network access modules 238, and lower layer connection 281. A measured round trip time can be used to calculate a closeness metric value. Other measurements can be taken to detect and map routes between computer systems (e.g., by use of a trace route utility). Detected and mapped routes can also be used to calculate a closeness metric value.

For example, computer system 242 can use pre-configured and measured characteristics of lower layer connection 283, network modules 228, lower layer connection 292, network 298, lower layer connection 291, network device modules 218, and lower layer connection 271 to calculate a closeness metric value for computer system 211. Alternately, computer system 242 can calculate a closeness metric value to zone 210. When calculating a closeness metric value for a zone, computer system 242 may not use characteristics of lower layer connections behind network access modules that represent a zone boundary. For example, when calculating a closeness metric value for zone 210, computer system 242 may not use characteristics of lower layer connections behind network modules 218 (which can be viewed as representing zone boundary 219).

It may be that an invitation message received by computer system 242 contains a data structure, similar to that in depicted in Table 1, representing the closeness of computer systems participating in a multi-party application layer session. The data structure can include one or more computer system identifier fields, each representing a computer system identifier that identifies a participating computer system participating in a multi-party application layer session. A computer system identifier can be, for example, a network address (e.g., an IP address) or Uniform Resource Identifier ("URI"). The data structure can also include one or more closeness fields, each representing a closeness metric value indicating the closeness of two participating computer systems represented in computer system identifier fields.

Accordingly, computer system 242 can identify, based on computer systems within a specified closeness threshold of one another, computer systems that are in the same zone. For example, based on the closeness metric value of 1, computer system 242 can identify that computer systems 211, 212, and 213 are probably in the same zone. Thus, calculating a closeness metric value between computer system 242 and each of computer systems 211, 213, and 213, may be viewed as redundant.

Step 305 also includes a corresponding act of identifying an application layer connection point within a specified threshold of closeness to the joining computer system (act 303). Act 303 can include identifying an application layer connection point at a computer system that is to participate (or is participating) in the multi-party application layer session. An application layer connection point can be an application layer (e.g., a conferencing application) at a computer system that is to participate or that is participating in the multi-party application layer session.

It may be that a joining computer system receives an invitation message from an inviting computer system that is not participating in an existing multi-party application layer session. Accordingly, establishment of multi-party application layer session results after the joining computer system establishes an application layer connection to the inviting computer system. When establishing an application layer connection to an inviting computer system, the joining computer system can join a zone that includes the inviting computer system or can establish a new zone. When a joining computer system is within a specified threshold of closeness to an inviting computer system, the joining computer system may join a zone that includes the inviting computer system. On the other hand, when a joining computer system is not within a specified threshold of closeness to the inviting computer system, the joining computer system can establish a new zone. Thus, although there is a single application layer connection point (i.e., the inviting computer system) there is no requirement that the inviting computer system and joining computer system be included in the same zone.

Similarly, when an existing multi-party application layer session includes a single existing zone, a joining computer system can join the existing zone based on a threshold of closeness to the zone. For example, if zone 230 were the only zone in logical arrangement 201, zone boundary 239 could be expanded to include a joining computer system. On the other hand, a joining computer system can establish a new zone based on a threshold of closeness to the zone. Thus, a joining computer system can establish an application layer connection to a computer system in an existing zone but may nonetheless also establish a new zone.

When an existing multi-party application layer session includes a plurality of zones, such as, for example, an electronic conference represented by logical arrangement 201, an identified application layer connection point can be at a computer system in the zone that is closest to the joining computer system. For example, computer system 242 can compare calculated closeness metric values for zones 210, 220, and 230 to determine the zone that is closest to computer system 242. Referring back to network architecture 200, computer system 242 is physically located on the same side of network modules 228 (a lower layer connection potentially having a high pre-configured cost) as computer systems 221, 222, and 223. Thus, computer system 242 may identify zone 220 as the zone that is closest to computer system 242. Accordingly, computer system 242 can identify an application layer connection point (e.g., a conferencing application) at one of the computer systems within zone 220.

The method 300 includes an act of establishing an application layer connection to the application layer connection point (act 304). Act 304 can include the joining computer system establishing an application layer connection that enables the joining computer to participate in the multi-party application layer session. For example as depicted by application layer connection establishment 254, application layer 244 establishes an application layer connection to application layer 224. The established application layer connection can enable computer system 252 to participate in a conferencing session represented by logical arrangement 201. If computer system 242 also joins zone 220, zone boundary 229 can be expanded to include computer system 242. Accordingly, a joining computer system can connect to an existing multi-party application layer session in a manner that reduces the likelihood of conferencing data being repeatedly transferred across lower layer connections that potentially have higher resource costs.

In some embodiments, application layer data is transferred between computer systems in a manner that conserves resources associated with lower layer connections. A computer system receives an indication that application layer data, such as, for example, conferencing data, is to be transferred to each participating computer system participating in a multi-party application layer session. For example, computer system 222 can receive an indication from application layer 224 that application layer 224 has conferencing data that is to be transferred to other computer systems in logical hierarchy 201. When application layer data originates at a computer system (i.e., the computer system is the source of the application layer data), the computer system can be viewed as a source computer system. For example, when conferencing data originates at application layer 224, computer system 222 can be viewed as a source computer system.

Closeness metric values are checked for at least each zone of the multi-party application layer session. When a source computer system has application layer data to transfer, the source computer system can determine zone configuration, such as, for example, by checking closeness metric values similar to those contained in Table 1. Based on zone configuration, the source computer system determines how the application layer data can be delivered such that the application layer data is transferred between zones a reduced number of times, potentially only once. For example, when application layer 224 has conferencing data to deliver to other computer systems in logical arrangement 201, computer system 222 can check closeness metric values to determine what computer systems are in the same zone and what computer systems are in different zones.

Accordingly, a data packet containing application layer data is configured for delivery to a participating computer system. For example, application layer 224 can configure data packets containing conferencing data such that the data packets are transferred between zone 220 and zone 210 only once and between zone 220 and zone 230 only once. A source computer system (e.g., computer system 222) can configure data packets by including routing information in a data stream header. The routing information can indicate to other computer systems how to forward the data packet.

For example, application layer 224 can configure data packets (containing conferencing data) such that the data packets will be routed from computer system 222, to computer system 223, to computer system 221, to computer system 213, to computer system 211, to computer system 212. The routing information in a data packet can indicate to intermediate computer systems how the data packet is to be forwarded. For example, a portion of routing information in a data packet can indicate to computer system 221 that computer system 221 is to forward the data packet to computer system 213. In a similar manner, application layer 224 can also configure data packets for transfer to the computer systems in zone 230.

The configured data packet is transferred towards the participating computer system. When computer system 222 is the source computer system, data packets can be delivered to computer systems in zone 210 by transferring the data packets across lower layer link 291 and through network access modules 218 only once. Similarly, when computer system 222 is the source computer system, data packets can be delivered to computer systems in zone 230 by transferring the data packets across lower layer connection 293 and through network access modules 238 only once. When computer system 222 is the source computer system, it may also be that data packets are transferred through network access modules 228 and across lower layer link 292 only once. For example, application layer 224 may configure a data packet (containing conferencing data) such that the data packet is to be delivered to a plurality of different zones. Application layer 224 can include routing information that causes a router (or other appropriate network device) in network 298 to transfer a one copy the data packet to computer systems in zone 210 and another copy of data packet to computer systems in zone 230.

When a different source computer system, such as, for example, computer system 234, receives an indication that application layer data is to be transferred, zone configuration is determined (e.g., by checking closeness metric values) from the perspective of the different source computer system. Based on the zone configuration, the different source computer system determines how data packets (e.g., containing application layer data) can be transferred such that the data packets are transferred between zones a reduced number of times. For example, when computer system 234 has conferencing data to send to other computer systems in logical arrangement 201, computer system 234 can check closeness metric values to determine what computer systems are in the same zone and what computer systems are in different zones. Accordingly, computer system 234 can configure data packets such that the data packets are transferred between zones a reduced number of times.

When appropriate, a computer system in zone 230 (the zone that contains computer system 234) can establish a new application layer connection to further conserve lower layer resources. For example, computer system 233 may determine, after checking closeness metric values, that an application layer connection from computer system 233 to 212 would further reduce the lower layer resource cost of transferring data packets from zone 210. That is, the data packets would not have to be transferred through zone 220.

The present invention may be embodied in other specific forms without departing from it spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a joining computer system that is network connectable to at least an inviting computer system, the inviting computer system including an inviting computer application layer configured to participate in multi-party application layer sessions, a method for the joining computer system to connect to a previously established multi-party application layer session, the established multi-party application layer session having participating computer systems that are currently participating in the established multi-party application layer session, the currently participating computer systems including the inviting computer system, in a manner that promotes conservation of resources associated with lower layer connections being provided by a host that does not participate in the established multi-party application layer session, the method comprising:

an act of receiving, at the joining computer system that is not currently participating in the established multi-party application layer session, an invitation to join the established multi-party application layer session, the invitation being sent from the inviting computer system that is currently participating in the established multi-party application layer session to the joining computer system that is not currently participating in the established multi-party application layer session;

an act of calculating at the joining computer system that is not currently participating in the established multi-party application layer session, a closeness metric value for each of a plurality of zones of the established multi-party application layer session, each closeness metric being calculated from two or more different characteristics of a lower layer connection connecting the joining computer system to a corresponding zone, the lower layer connection being provided by the host that does not participate in the established multi-party application layer session, a zone representing a plurality of participating computer systems, the zones being connected to form the established multi-party application layer session;

an act of identifying, at the joining computer system that is not currently participating in the established multi-party application layer session, an application layer connection point of a zone within a specified threshold of closeness to the joining computer system, the identified application layer connection point being at a participating computer system that is currently participating in the established multi-party application layer session; and an act of establishing, at the joining computer system that is not currently participating in the established multi-party application layer session, an application layer connection to the application layer connection point, the established application layer connection enabling the joining computer system to start participating in the established multi-party application layer session by communicating through the application layer connection point that is a participating computer system of a corresponding zone within the specified threshold of closeness such that, upon establishing the application layer connection to the application layer session, the joining computer system becomes a currently participating computer system in the established multi-party application layer session.

2. The method as recited in claim 1, where the act of receiving an invitation to join the established multi-party application layer session comprises an act of receiving an invitation message that contains a plurality of computer system identifier fields and one or more closeness fields, each identifier field identifying a participating computer system that is currently participating in the established multi-party application layer, each closeness field representing a value of the closeness metric indicating a closeness of the associated participating computer system.

3. The method as recited in claim 1, where the act of receiving an invitation to join the established multi-party application layer session comprises an act of receiving an invitation message from the inviting application layer.

4. The method as recited in claim 1, wherein the act of calculating a closeness metric value for at least each zone of the established multi-party application layer session comprises an act of calculating a closeness metric value based on a pre-configured cost associated with a lower layer connection being provided by the host.

5. The method as recited in claim 1, wherein the act of calculating a closeness metric value for at least each zone of the established multi-party application layer session comprises an act of calculating a closeness metric value based on results of lower layer connection measurements.

6. The method as recited in claim 1, wherein the act of calculating a closeness metric value for at least each zone of the established multiparty application layer session comprises an act of calculating a closeness metric value based on the latency of a lower layer connection being provided by the host.

7. The method as recited in claim 1, wherein the act of calculating a closeness metric value for at least each zone of the established multiparty application layer session comprises an act of calculating a closeness metric value based on the available bandwidth of a lower layer connection being provided by the host.

8. The method as recited in claim 1, wherein the act of calculating a closeness metric value for at least each zone of the established multi-party application layer session comprises an act of calculating a closeness metric value based on the maximum bandwidth of a lower layer connection being provided by the host.

9. The method as recited in claim 1, wherein the act of calculating a closeness metric value for at least each zone of the established multi-party application layer session comprises an act of calculating a closeness metric value based on a resource cost associated with transferring conferencing data through one or more security modules.

10. The method as recited in claim 1, wherein the act of calculating a closeness metric value for at least each zone of the established multi-party application layer session comprises an act of calculating a closeness metric value based on a resource cost associated with transferring conferencing data through one or more connectivity modules.

11. The method as recited in claim 1, wherein the act of calculating a closeness metric value for at least each zone of the established multi-party application layer session comprises an act of calculating a closeness metric value based on a resource cost associated with transferring conferencing data through demilitarized zone.

12. The method as recited in claim 1, wherein the act of calculating a closeness metric value for at least each zone of the established multi-party application layer session comprises an act of calculating a closeness metric value based on protocols utilized by a lower layer connection being provided by the host.

13. The method as recited in claim 1, wherein the act of calculating a closeness metric value for at least each zone of the established multiparty application layer session comprises an act of calculating a closeness metric value for each zone of an electronic conference.

14. The method as recited in claim 1, wherein the act of calculating a closeness metric value for at least each zone of the established multi-party application layer session comprises an act of calculating a closeness metric value for each computer system that is currently participating in the established multi-party application layer session.

15. The method as recited in claim 1, wherein the act of identifying an application layer connection point within a specified threshold of closeness to the joining computer system comprises an act of identifying a zone that is associated with the lowest closeness metric value.

16. The method as recited in claim 15, wherein the act of identifying an application layer connection point within a specified threshold of closeness to the joining computer system comprises an act of identifying a computer system included in the zone that is closest to the joining computer system and that is currently participating in the established multi-party application layer session.

17. The method as recited in claim 1, wherein the act of establishing an application layer connection to the application layer connection point comprises an act of a joining application layer at the joining computer system connecting to the inviting application layer.

18. The method as recited in claim 1, wherein the act of establishing an application layer connection to the application layer connection point comprises an act of a joining application layer at the joining computer system connecting to a participating application layer at a participating computer system, the participating computer system being a computer system that is currently participating in the established multi-party application layer session.

19. The method as recited in claim 1, wherein the act of establishing an application layer connection to the application layer connection point comprises an act of establishing a connection to an electronic conference.

20. The method as recited in claim 1, further comprising: an act of the joining computer system determining that a new zone is to be established.

21. The method as recited in claim 20, further comprising: an act of the joining computer system establishing the new zone.

22. The method as recited in claim 1, further comprising: an act of the joining computer system joining the zone that includes the identified application layer connection point.

23. The method as recited in claim 1 wherein at least two of the two or more different characteristics are selected from the group consisting of available bandwidth, maximum bandwidth, latency, suggested protocols, resource consumption, and financial cost.

24. The method as recited in claim 1 wherein the closeness metric is calculated based on varying weights of the two or more different characteristics.

25. A computer program product for use in a joining computer system that is network connectable to at least an inviting computer system, the inviting computer system including an inviting application layer configured to participate in an established multi-party application layer session, the computer program product for implementing a method for the joining computer system that is not currently participating in the established multi-party application layer session to connect to the established multi-party application layer session having participating computer systems that are currently participating in the established multi-party application layer session, the currently participating computer systems including the inviting computer system, in a manner that promotes conservation of resources associated with lower layer connections utilizing network technologies provided by a host that does not participate in the established multi-party application layer session, the computer program product comprising one or more computer-readable physical storage media having stored thereon computer executable instructions that, when executed by a processor, cause the joining computer system to perform the following:

receive an invitation to join a-the established multi-party application layer session, the invitation being sent from the inviting computer system that is currently participating in the established multi-party application layer session;

calculate a closeness metric value for each of a plurality of zones of the established multi-party application layer session, each closeness metric being calculated from two or more different characteristics of a lower layer connection connecting the joining computer system to a corresponding zone, a zone comprising a plurality of participating computer systems that are currently participating in the established multi-party application layer session, the zones being connected to form the established multi-party application layer session, the lower layer connection being provided by the host that does not participate in the established multi-party application layer session;

identify an application layer connection point of a zone within a specified threshold of closeness to the joining computer system, the identified application layer connection point being at a participating computer system that is currently participating in the established multi-party application layer session; and establish an application layer connection to the application layer connection point, the established application layer connection enabling the joining computer system to participate in the established multi-party application layer session by communicating through the application layer connection point that is a participating computer system of a corresponding one within the specified threshold of closeness.

26. The computer program product as recited in claim 25, wherein computer-executable instructions that when executed cause the joining computer system to calculate a closeness metric value for at least each zone of the established multi-party application layer session further comprise computer-executable instructions that when executed cause the joining computer system to calculate a closeness metric value based on a pre-configured cost associated with a lower layer connection.

27. The computer program product as recited in claim 25, wherein computer-executable instructions that when executed cause the joining computer system to calculate a closeness metric value for at least each zone of the established multi-party application layer session further comprise computer-executable instructions that when executed cause the joining computer system to calculate a closeness metric value based on results of lower layer connection measurements.

28. The computer program product as recited in claim 25, wherein computer-executable instructions that when executed cause the joining computer system to establish an application layer connection to the application layer connection point further comprise computer-executable instructions that when executed cause a joining application layer at the joining computer system to connect to the inviting application layer.

29. The computer program product as recited in claim 25, wherein computer-executable instructions that when executed cause the joining computer system to establish an application layer connection to the application layer connection point further comprise computer-executable instructions that when executed cause a joining application layer at the joining computer system to connect to a participating application layer at a participating computer system, the participating computer system being a computer system that is currently participating in the established multi-party application layer session.

30. The computer program product as recited in claim 25, wherein computer-executable instructions that when executed cause the joining computer system to establish an application layer connection to the application layer connection point further comprise computer-executable instructions that when executed cause a joining application layer at the joining computer system to connect to an electronic conference.

31. The computer program product as recited in claim 25, further comprising computer-executable instructions that, when executed by a processor, cause the joining computer system to perform the following:

determine that a new zone for the established multi-party application layer is to be established; and establish the new zone for the established multi-party application layer session.

32. The computer program product as recited in claim 25, further comprising computer-executable instructions that, when executed by a processor, cause the joining computer system to perform the following:

join the zone that includes the application layer connection point.

33. The computer program product as recited in claim 25, wherein the one or more computer-readable media are physical media.

34. The computer program product as recited in claim 25, wherein the one or more computer-readable media include system memory.

35. In a joining computer system that is network connectable to at least an inviting computer system, the inviting computer system including an inviting computer application layer configured to participate in an established multi-party application layer session, a method for the joining computer system not currently participating in the established multi-party application layer session to connect to the established multi-party application layer session having participating computer systems that are currently participating in the established multi-party application layer session, the participating computer systems including the inviting computer system, in a manner that promotes conservation of resources associated with lower layer connections utilizing network technologies provided by a host that does not participate in the established multi-party application layer session, the method comprising:

an act of receiving an invitation to join the established multi-party application layer session, the invitation being sent from the inviting computer system that is currently participating in the established multi-party application layer session;

an act of calculating a closeness metric value for zones of the established multi-party application layer session, each closeness metric being calculated from a pre-configured cost associated with a lower layer connection connecting the joining computer system to a corresponding zone, a zone representing a plurality of participating computer systems that are currently participating in the established multi-party application layer session, the zones being connected to form the established multi-party application layer session;

an act of identifying an application layer connection point of a zone within a specified threshold of closeness to the joining computer system as indicated by the closeness metrics, the identified application layer connection point being at a participating computer system that is currently participating in the established multi-party application layer session; and an act of establishing an application layer connection to the application layer connection point, the established application layer connection enabling the joining computer system to participate in the established multi-party application layer session by communicating through the application layer connection point that is a participating computer system of a corresponding zone within the specified threshold of closeness.

* * * * *

UNITED STATES PATENT AND TRADEMARK OFFICE
CERTIFICATE OF CORRECTION

PATENT NO.         : 7,580,976 B2                                    Page 1 of 1
APPLICATION NO. : 10/418493
DATED              : August 25, 2009
INVENTOR(S)        : John Anthony Taylor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Fourteenth Day of September, 2010

David J. Kappos
*Director of the United States Patent and Trademark Office*